United States Patent [19]

Vasile

[11] Patent Number: 5,089,823
[45] Date of Patent: Feb. 18, 1992

[54] MATRIX ANTENNA ARRAY

[75] Inventor: Carmine F. Vasile, Medford, N.Y.

[73] Assignee: Grumman Aerospace Corporation, Bethpage, N.Y.

[21] Appl. No.: 620,213

[22] Filed: Nov. 30, 1990

[51] Int. Cl.$^5$ .............................. G01S 3/16; G01S 3/28
[52] U.S. Cl. ...................................... 342/383; 342/382
[58] Field of Search ........................ 342/382, 380, 383

[56] References Cited

U.S. PATENT DOCUMENTS 4,800,390  1/1989  Searle ................................... 342/383

*Primary Examiner*—Theodore M. Blum
*Attorney, Agent, or Firm*—Pollock, Vande Sande & Priddy

[57] ABSTRACT

To eliminate the complexity and the weight involved in the use of a Butler matrix, the present invention matrix antenna array uses a combination of processors and analog multipliers for weighting the signals, either to be transmitted or received, from the corresponding antenna element of the array. Since the analog multipliers are adaptable to operate in the microwave frequency, the control signals can be multiplied with the radar signal directly so that complexity of construction, bulkiness and heavy weight are eliminated from the matrix antenna array of the present invention.

10 Claims, 4 Drawing Sheets

MATRIX ANTENNA ARRAY

FIELD OF THE INVENTION

The present invention relates to antenna arrays and more particularly to a matrix antenna array which is capable of steering multiple beams.

BACKGROUND OF THE INVENTION

In a conventional phase array antenna, each element, i.e. the antenna, of the array has a particular weight. Consequently, only one beam may be formed from such antenna array with one input signal. If multiple signals are provided, a plurality of beams may actually be formed. The signals provided can be in the form of local oscillator waveforms; and the weight provided can be complex, such that a local mixer, in effect, results.

If additional signals, such as for example more than one local oscillator signal, are required, the antenna array can become extremely complex, as in the form of a Butler matrix. Such Butler matrix is well known and is shown, for example, on page 69 of the Section entitled *Radar, Navigation, And Underwater Sound Systems* in the "Electrons Engineers' Handbook" edited by Fink, published by the McGraw Hill Co., (1975). If anything more than four beams are to be used, a Butler matrix becomes extremely complicated, heavy and unwieldy.

Consequently, there is a need to provide a beam forming matrix network which is capable of controlling a multiple number of beams, and yet at the same time is simple to construct. Moreover, such antenna matrix must have a space requirement which is substantially less than that of a Butler matrix and weigh substantially less than conventional array matrixes.

BRIEF DESCRIPTION OF THE PRESENT INVENTION

To provide the capability of controlling multiple beams, the matrix antenna array of the present invention uses a plurality of processors/conditioners, each of which is connected to an analog multiplier, and a corresponding plurality of analog multipliers. Each of the analog multipliers is connected to a corresponding antenna, i.e. an element, of the matrix antenna array. The respective outputs of the analog multipliers are summed by a summer, and the output therefrom may be used to determine the characteristics of the received signals, which are representative of the echo of the image reflected from a target to which a radar beam has been directed.

The processors/conditioners provide predetermined weights to their respective input signals, so that a properly weighted signal, which may be a sinusoidal waveform such as a local oscillator signal, is fed to the corresponding analog multiplier. The properly weighted signal is then multiplied with the incoming signal, from the antenna, in the analog multiplier. As the outputs from the plurality of analog multipliers are summed, a multiple beam matrix antenna array is provided.

Given the proper analog multipliers which can operate in radar frequency (RF), and more specifically in a microwave frequency environment, a matrix antenna array can easily be effected.

In place of the processors, a second embodiment of the present invention matrix antenna array utilizes corresponding controllers which can accept optical information. For this embodiment, a wavelength division multiplier is used to multiplex optical information with control data so that weighted signals are provided to vector modulators, the outputs of which are fed to the analog multipliers. For this second embodiment, the output signal from the summer is fed to a channelized filter, from whence different frequencies of the signal may be separated for further signal processing.

With both of the embodiments, inasmuch as the control signals are weighted off line from the received radar image signals, there is low distortion for the matrix antenna array. Moreover, since the number of beams which the matrix antenna array can operate on is dependant on the number of analog multipliers, extra degrees of freedom, in terms of the number of beams which can be steered by the matrix antenna array, results.

It is therefore an objective of the present invention to provide for a matrix antenna array which has low distortions.

It is another objective of the present invention to provide for a matrix antenna array that can control multiple beams, without encountering the complicated structure of a Butler matrix array.

BRIEF DESCRIPTION OF THE FIGURES

The above-mentioned objectives and advantages of the present invention will become more apparent and the invention itself will be best understood by reference to the following description of embodiments of the invention taken in conjunction with the accompanying drawings, wherein.

DETAILED DESCRIPTION OF THE PRESENT INVENTION

Figure 1:
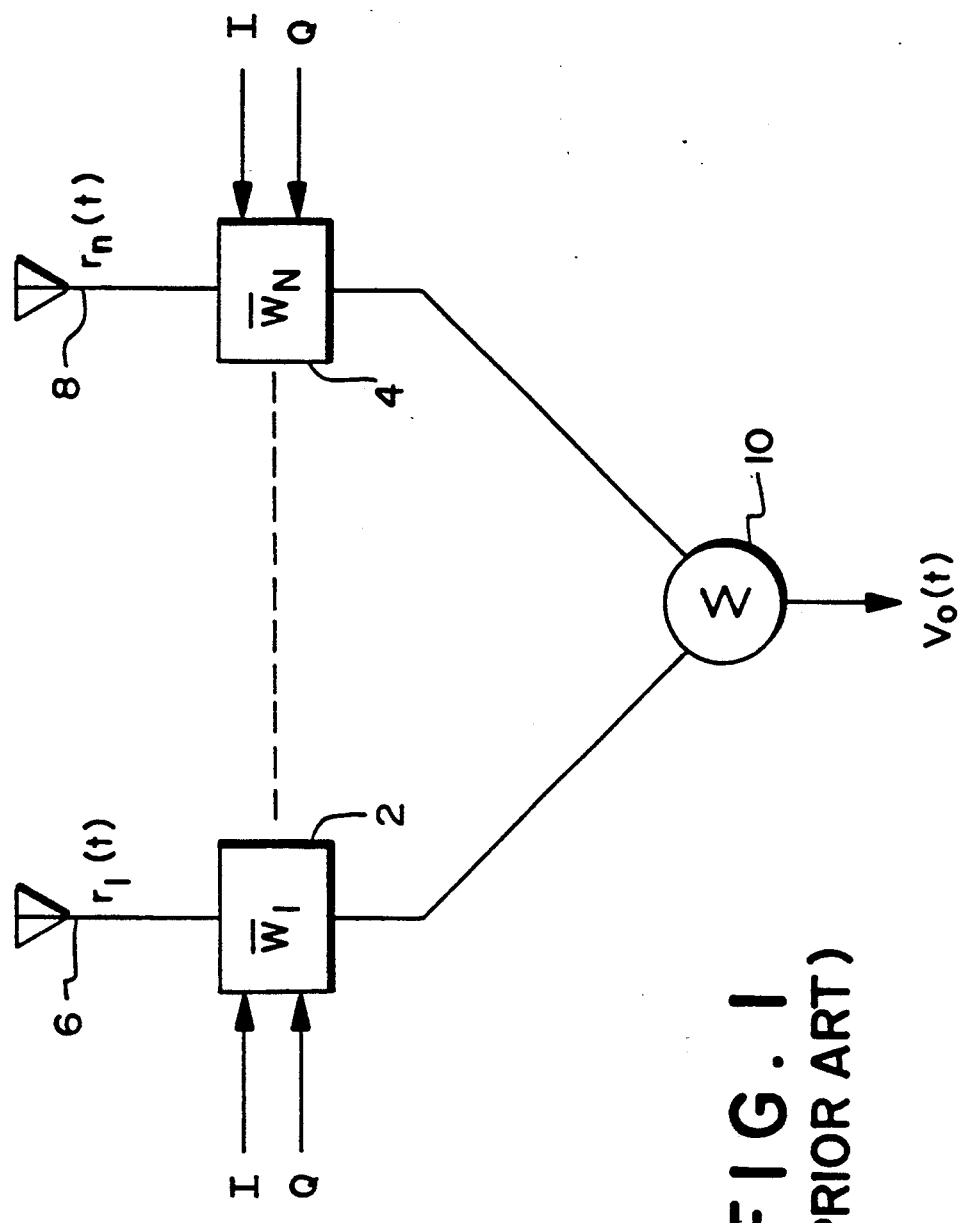
FIG. 1 is a simplified schematic of a prior art matrix antennas array.
Figure 3B:
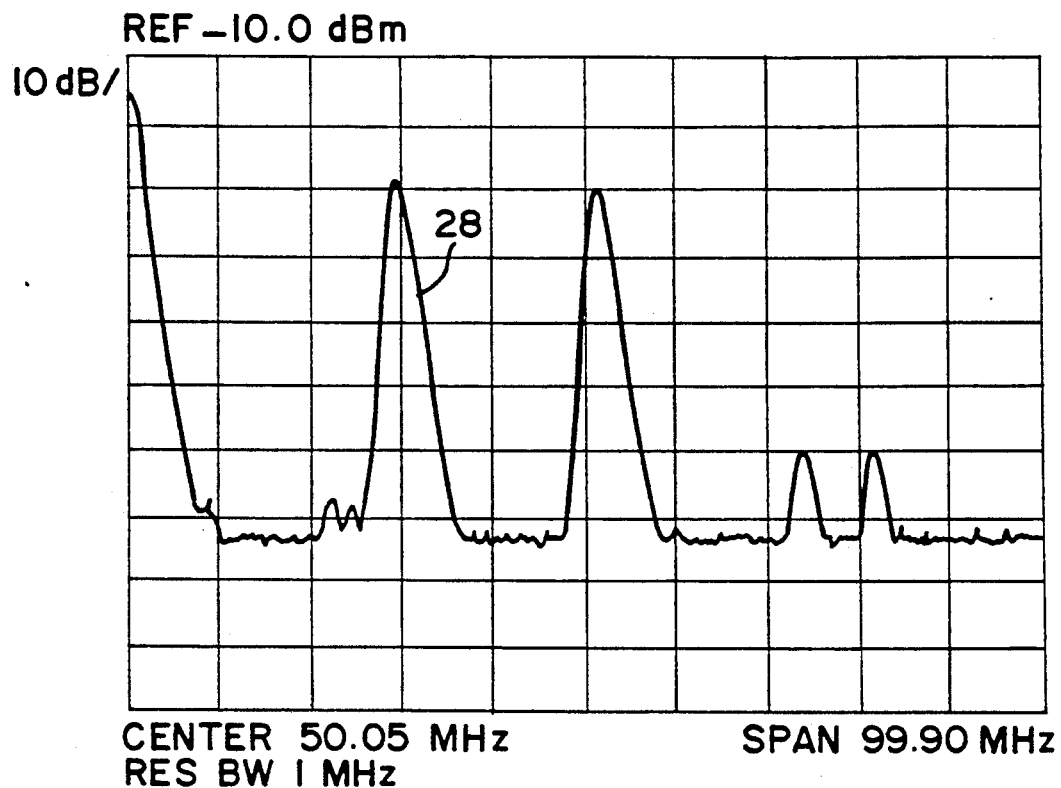
FIG. 3b is a graph illustrating the improved performance of the present invention matrix antenna array which utilizes microwave frequency operative analog multipliers.
Figure 3A:
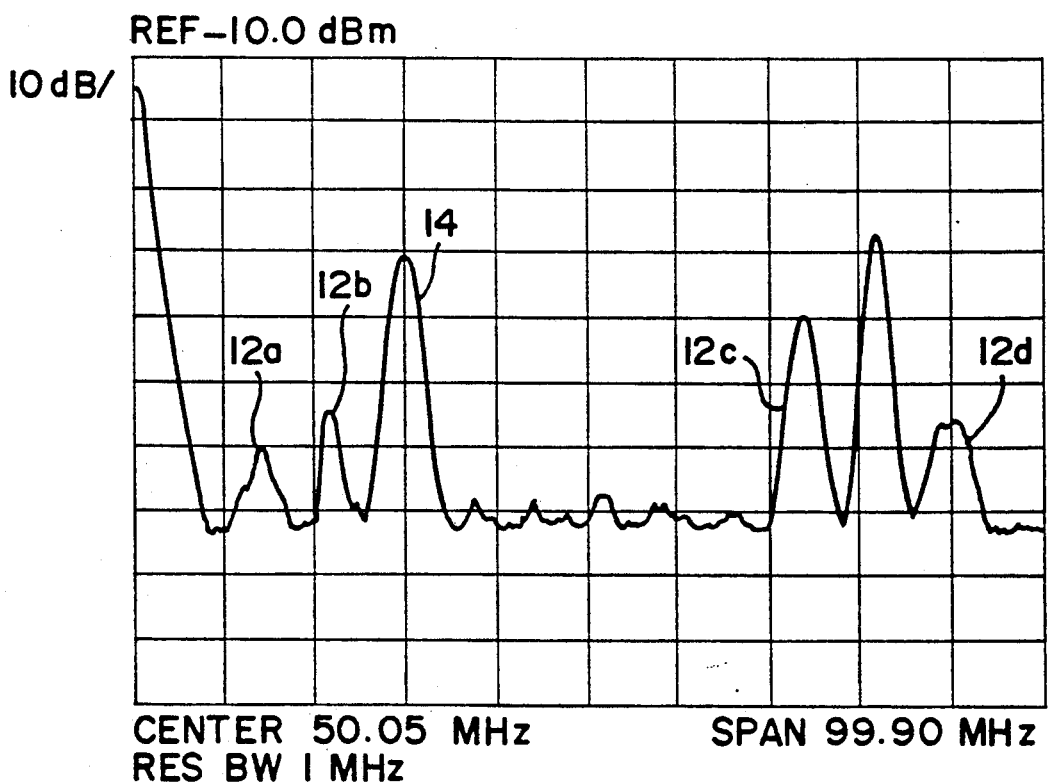
FIG. 3a is a graph illustrating the performance of a prior art matrix antenna array that utilizes a conventional diode mixer.

With reference to FIG. 1, there is shown a prior art matrix antenna array which uses mixers, for example diode mixers 2 and 4, for providing the appropriate weighting of the characteristics, such as the amplitude and phase, or the in-phase (I) and quadrature (Q) components, of the radar signal to be transmitted or received via antennas 6 and 8. With such a matrix antenna array, since it is being controlled in terms of its phase and amplitude, the dynamic range of the information passing through mixers 2 and 4 is affected. Consequently, distortions such as those shown in FIG. 3a result. Incidentally, for the diode mixer matrix array of FIG. 1, notwithstanding the various distortions, such as 12a, 12b, 12c and 12d shown in FIG. 3a, the maximal amplitude of the signal output from the FIG. 1a matrix array is only approximately 25 db, as indicated by the peak of pulse 14.

Figure 2:
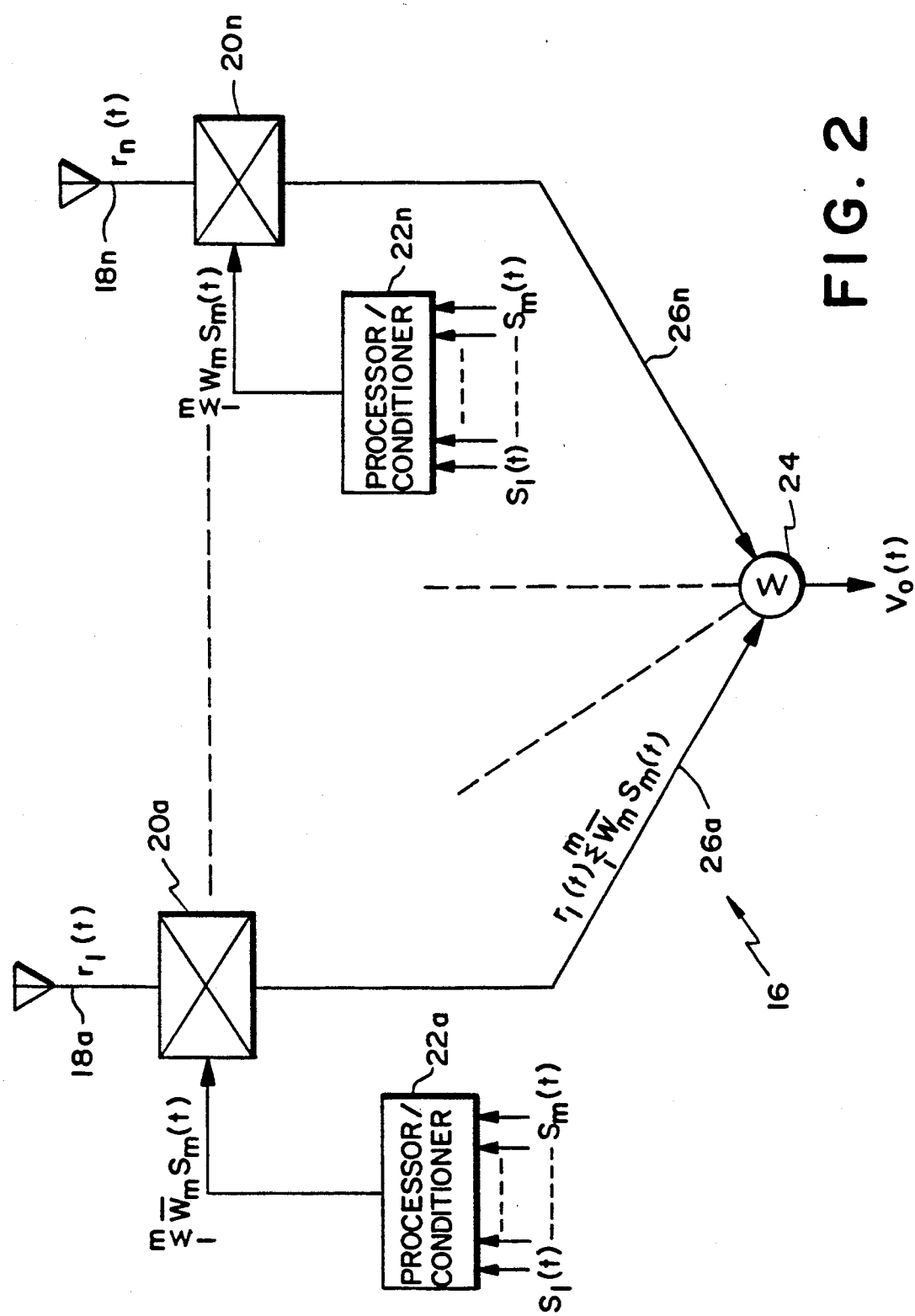
FIG. 2 is a simplified schematic of the present invention matrix antenna array.

With reference to FIG. 2, there is shown an embodiment of the present invention matrix antenna array 16. For matrix array 16, in its simplest form, there is shown a plurality of antennas 18a to 18n. Shown connected to the respective antennas are corresponding analog multipliers 20a to 20n. These analog multipliers are radar frequency (Rf) operational multipliers which can in particular operate in the microwave frequency range, and are discussed in U.S. Pat. 4,705,967, incorporated herein by reference. Briefly, these analog multipliers are multi-function floating field effect transistors (FET) fabricated of gallium arsenide (GaAs) and formed with a metal-semiconductor junction, and are usually referred to as MESFETs. These FETs can operate in the higher frequencies including the microwave frequency region, and can be used as amplifiers, modulators, multipliers and mixers, to name but a few of their uses.

Returning to FIG. 2, each of the analog multipliers 20a to 20n has connected thereto, as an input, the output of a corresponding processor/conditioner 22a to 22n. Processor 22 is a conventional microprocessor which accepts as inputs a plurality of control signals $s_1(t)$ to $s_m(t)$. Each of the analog multipliers 20a to 20n further has an output fed to a summer 24, which may be a conventional wave length multiplier.

A more detailed discussion of the relationship between processors 22a to 22n with the control signals is given in co-pending application entitled "Optical Control of TR Modules" by Vasile et al., and incorporated herein by reference.

Briefly, in the just noted co-pending application, there is disclosed the optical distribution of signals to different transmitter receiver (TR) modules which operate over a broad frequency range. The TR modules are used to transmit and receive radar signals in a phase array type radar system, such as a matrix antenna array. To control each TR module in the array, a combination of oscillator and information control signals is needed. As taught in the co-pending application, these signals are multiplexed onto different optical signals, which are then summed and transmitted to the respective TR modules, by means of optical fibers. A number of different signals are provided from a fusion center (or processing center), including at least one oscillator signal to provide synchronization for the different TR modules. Different control signals are fed to the different TR modules to control their respective operations. In each of the TR modules, there is a corresponding mixer that demodulates the radar signal with the local oscillator signal so that the phase and amplitude of the radar signal, for the particular TR modular, are weighted relative to the other TR modules. A synchronized radar frequency signal, resulting from combining the modulated radar signals from the respective TR modules, can then be transmitted from the array of TR modules, via the different antennas associated with the TR modules, to an of interest target.

The TR modules have switches incorporated therein to change from the transmitter mode to receiver mode for receiving the echo reflected from the target. When acting as a receiver, each TR module would modulate the echo signal with the oscillator signal in the mixer, so that a synchronized down modulated signal is returned to the processing center for further signal processing.

For the sake of clarity, the different TR modules are not shown in the embodiment of FIG. 2. Stripped of all of the non-essential elements, the FIG. 2 embodiment shows that each of the processor 22a to 22n has input control signals $s_1(t)$ to $s_n(t)$. The control signals are weighted by the respective processors 22a to 22n so that predetermined weight is given to the respective amplitudes and phases of the control signal. The outputs from processor 22a to 22n are in the form of $$\sum_{1}^{m} W_m S_m(t) \quad (1)$$

where $\overline{W}_m$=weight of the particular processor
$S_m(t)$=control signals.

Since the operations of the respective processors and analog multipliers are the same, focus now only to the branch of the matrix array which contains processor 22a and analog multiplier 20a. As shown, the output from processor 22a is fed, as an input, to analog multiplier 20a. Also being fed to analog multiplier 20a is radar image signal $r_1(t)$, which also may be referred to as the radar echo signal, which is the reflection of an object having been impinged by a radar signal, as discussed in the co-pending application. It should be noted that equation (1) may be in the form of a sinusoidal signal, or a local oscillator signal. The multiplied signal, represented by $$r_1(t) \sum_{1}^{m} W_m S_m(t) \quad (2)$$

is output from analog multiplier 20a and fed, via line 26a, to summer 24. Of course, the other analog multipliers likewise output similar signals such as equation (2) to summer 24. By means of summer 24, the respective signals output from the different analog multipliers are summed, and shown as $v_0(t)$, represented by $$V_0(t) = \sum_{n=1}^{m} r_n(t) \sum_{1}^{m} W_m S_m(t) \quad (3)$$

where $r_n(t)$=radar image signals from the antennas.

Since each element, i.e., antenna, of the matrix array is connected to its own analog multiplier, and since each analog multiplier is operative in the microwave frequency, a multiple beam antenna array is thereby effected, so that, for example, separate beams may be pointing at different directions. This, of course, is dependant on the fact that the TR modules (which are not shown) have been switched onto the transmitting mode. Thus, in place of a Butler matrix where a very complex configuration is required in order to control multiple beams, the FIG. 2 embodiment of the present invention provides for a simple matrix antenna array which is capable of operating in the microwave frequency. In addition, since the control signals are fed off line, through processors 22a to 22n, to the analog multipliers, no distortion of the signals $r_1(t)$ to $r_n(t)$ is introduced. In fact, as shown in the output graph illustrated in FIG. 3b, not only is there no distortion to the signal $v_0(t)$, the desired signal, designated by 28, has a dynamic range of approximately 48 db. Compare the dynamic range of FIG. 3b with that of FIG. 3a, which is approximately 10 db lower. Hence, the matrix array of the FIG. 2 embodiment of the present invention almost doubles the dynamic range of a conventional matrix array which utilizes diode mixers.

Figure 4:
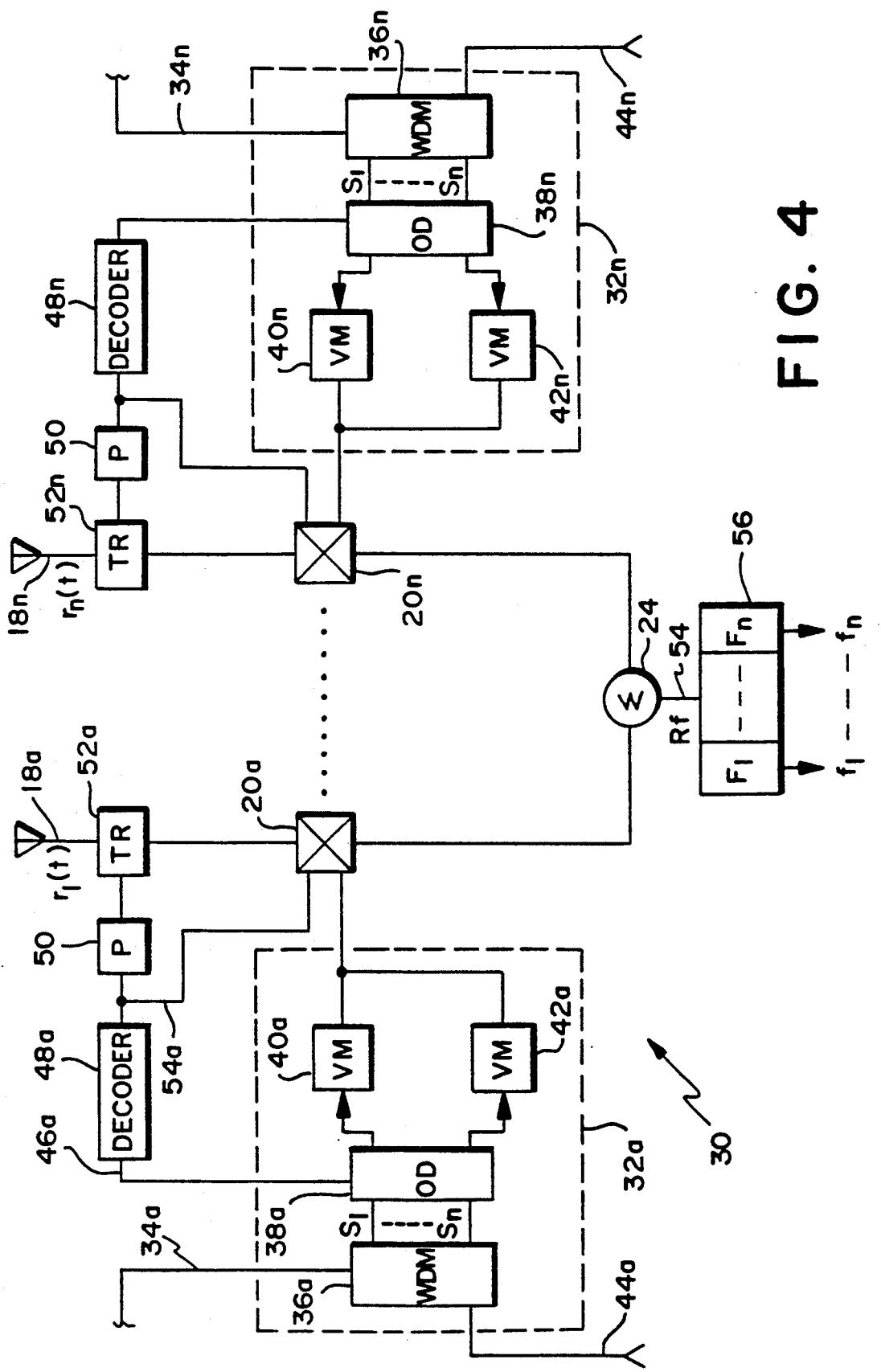
FIG. 4 is a schematic of a second embodiment of the present invention matrix antenna array.

A second embodiment of the present invention is illustrated in FIG. 4. Components in the FIG. 4 embodiment which are identical to those of the FIG. 2 embodiment are labeled the same. As shown, matrix antenna array 30 has the same analog multipliers, antennas, and summer as the FIG. 2 embodiment. But in place of processors 22a to 22n, a plurality of optical controllers, designated by dotted lines 32a to 32n, are used to receive optical signals being input from lines 34a to 34n, which may be comprised of optical fibers. Inside each of the optical controllers, and focusing only at optical controller 32a, are a wave length division multiplexer 36a, an optical detector 38a and two vector modulators 40a and 42a. Wavelength division multiplexer 36a is controlled by control signals, sent via line 44a.

As was discussed previously, the optical signals being fed to conventional wavelength division multiplexer 36a via line 34a include both control signals and a local oscillator signal. With wavelength division multiplexer 36a, the oscillator is separated from the control signals. The different signals are provided as inputs to optical detector 38a, which is made by a number of companies including Motorola, Hewlett Packard and Tachonics. Optical detector 38a, in essence, accepts the separated oscillator and control signals and converts the same to corresponding electrical signals.

An electrical signal which corresponds to the oscillator signal is then transmitted to conventional vector modulators 40a and 42a; whereas the electrical signals representative of the control signals are sent via line 46a to a conventional decoder 48a. The control signals are then deciphered by decoder 48a and the information contained therein is sent to a processor 50 which, in response to the information, obtains particular characteristics, such as phase and amplitude, from its associated memory (not shown), to provide control signals to a TR module 52a to control the operation of antenna 18a. The control signals from decoder 48a are also sent via line 54a to analog multiplier 20a. Likewise, the control signals output from vector modulators 40a and 42a are also sent to analog multiplier 20a. The control signals and the oscillator signals are multiplied with the signal from antenna 18a and fed to summer 24. Since the multiplied radar signal is weighted by the control and oscillator signals, in terms of its amplitude and phase, where it is added with the other similarly weighted and modulated signals from the other analog multipliers, such as 20n, by summer 24, a synchronized RF signal is output at line 54 to a conventional channelized filter 56, whereby the summed signal may be separated into its different frequencies for further signal processing. Each of the separated frequencies may correspond to a different beam being controlled in the matrix antenna array.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

What is claimed is:

1. An antenna array comprising:
    a plurality of antennas;
    a plurality of processor means each working cooperatively with a corresponding one of the antennas, each processor means having as inputs a plurality of control signals, the control signals being effectively weighted by the each processor means;
    a plurality of analog multiplier means each multiplying the weighted control signals from a corresponding processor means with signals from a corresponding antenna;
    whereby a multiple beam antenna array is effected by combining the multiplied antenna and weighted signals.

2. The antenna array of claim 1, wherein each analog multiplier means is a Rf operative analog multiplier.

3. The antenna array of claim 1, wherein each analog multiplier means comprises at least one FET operative in microwave frequency.

4. The antenna array of claim 1, further comprising:
    means for summing the multiplied antenna and weighted signals from each analog multiplier means to provide an output signal for determining the characteristics of radar signals received by the antennas.

5. The antenna array of claim 4, wherein the output signal is represented by $$V_0(t) = \sum_{n=1}^{N} r_n(t) \sum_{1}^{m} W_m S_m(t)$$

where
   $v_0$ = output voltage;
   $r_n$ = signals from one of the antennas;
   $W$ = weight assigned to one of the processor means;
   $S$ = control signals input to one of the processor means;
   $N$ = number of antennas; and
   $M$ = number of processor means.

6. An antenna array comprising:
    a plurality of antennas;
    a plurality of analog multiplier means each accepting as a first input a radar image signal received by a corresponding one of the antennas;
    a plurality of optical control means each providing as a second input to a corresponding analog multiplier means a weighted control signal;
    wherein each analog multiplier means multiplies its input radar image signal and weighted control signal to provide an output multiplied signal; and
    means for summing the respective output multiplied signals from the plurality of analog multiplier means to effect a multiple beam antenna array.

7. The antenna array of claim 6, further comprising:
    channelized filter means for separating the summed multiplied signals to respective frequency components for further signal processing.

8. The antenna array of claim 6, wherein each optical control means comprises:
    a wavelength division multiplexer for multiplexing input output information with control data to generate the weighted control signal;
    modulator means for modulating and providing the weighted control signal to the corresponding analog multiplier means.

9. The antenna array of claim 6, wherein each analog multiplier means comprises a Rf operative analog multiplier.

10. The antenna array of claim 6, wherein each analog multiplier means comprises at least one FET operative in microwave frequency.

* * * * *

UNITED STATES PATENT AND TRADEMARK OFFICE
CERTIFICATE OF CORRECTION

PATENT NO. : 5,089,823
DATED : February 18, 1992
INVENTOR(S) : Carmine F. Vasile It is certified that error appears in the above-identified patent and that said Letters Patent is hereby corrected as shown below:

Column 4, Equation (1) should read:

$$\sum_{1}^{m} \overline{W}_m S_m(t)$$

Column 4, Equation (2) should read:

$$r_1(t) \sum_{1}^{m} \overline{W}_m S_m(t)$$

Column 4, Equation (3) should read:

$$V_0(t) = \sum_{n=1}^{m} r_n(t) \sum_{1}^{m} \overline{W}_m S_m(t)$$

UNITED STATES PATENT AND TRADEMARK OFFICE
CERTIFICATE OF CORRECTION

PATENT NO. : 5,089,823
DATED      : February 18, 1992
INVENTOR(S): Carmine F. Vasile It is certified that error appears in the above-identified patent and that said Letters Patent is hereby corrected as shown below:

Column 6, the Equation should read:

$$V_0(t) = \sum_{n=1}^{N} r_n(t) \sum_{1}^{m} \overline{W}_m S_m(t)$$

Signed and Sealed this

Twenty-second Day of June, 1993

Attest:

MICHAEL K. KIRK

Attesting Officer       Acting Commissioner of Patents and Trademarks